Aug. 18, 1931.　　O. A. HOKANSON　　1,819,369
CASE SHIFT MECHANISM
Filed Feb. 24, 1925　　3 Sheets-Sheet 1
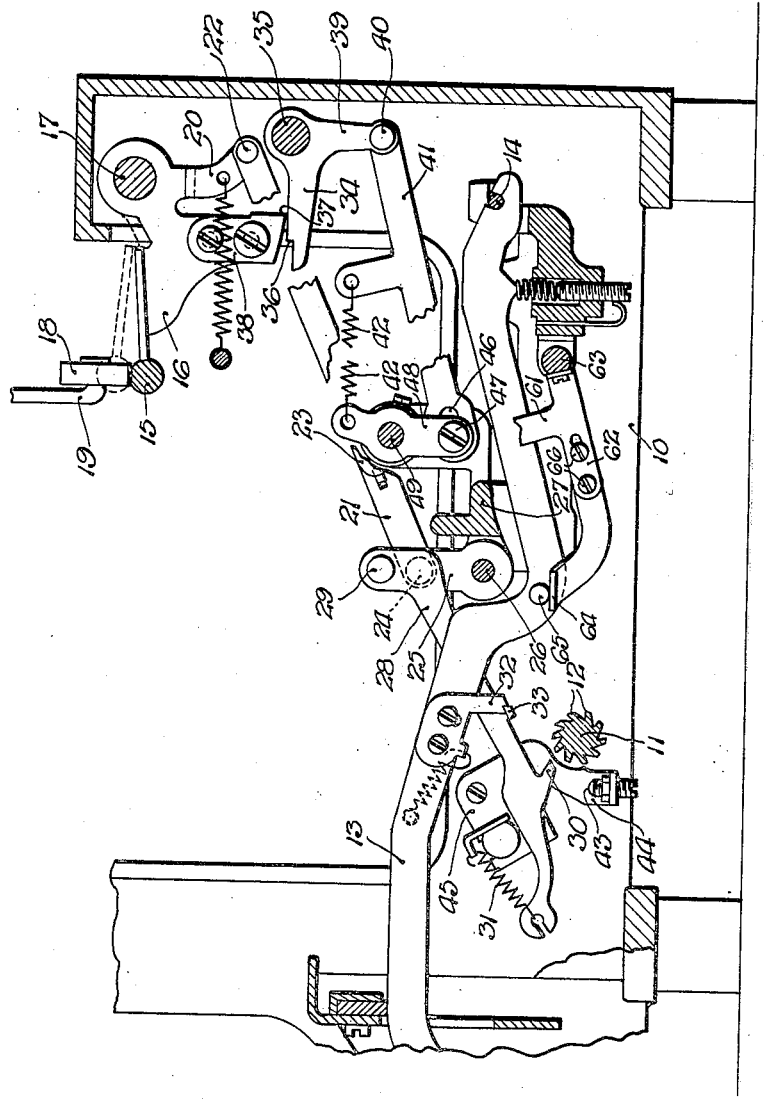
INVENTOR:
Otto A. Hokanson
BY Nissen & Crane
ATTYS.

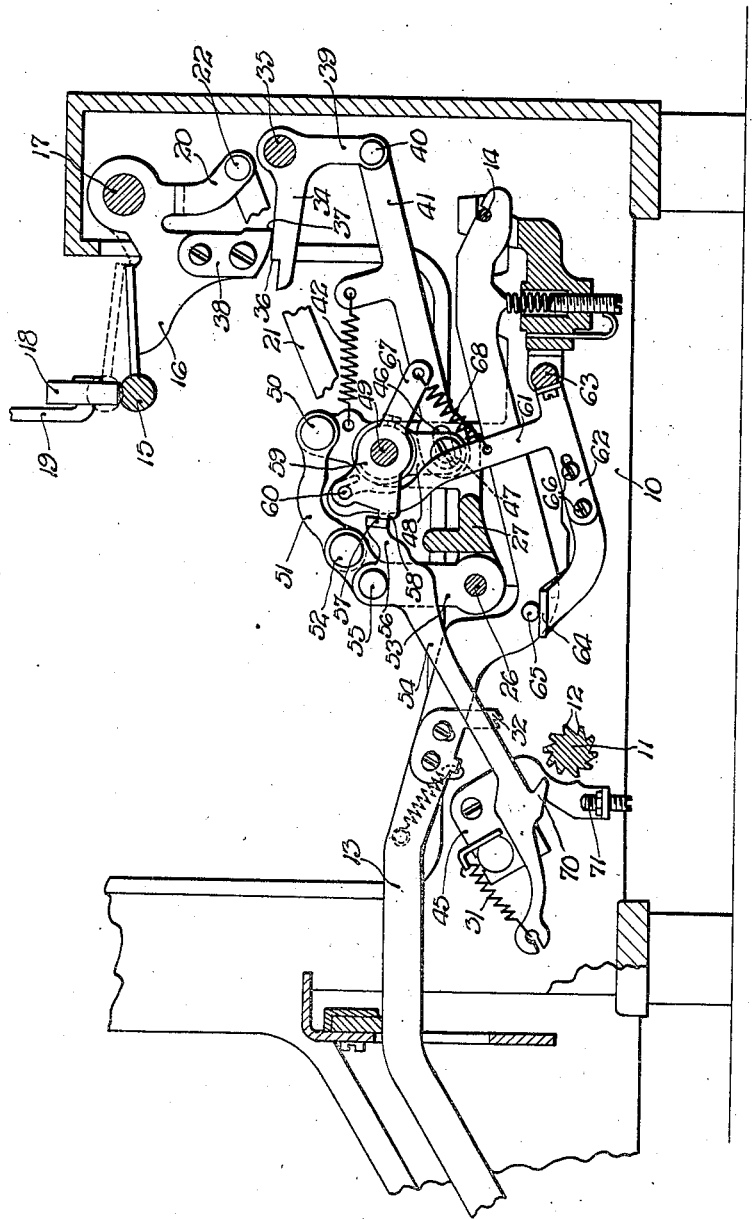

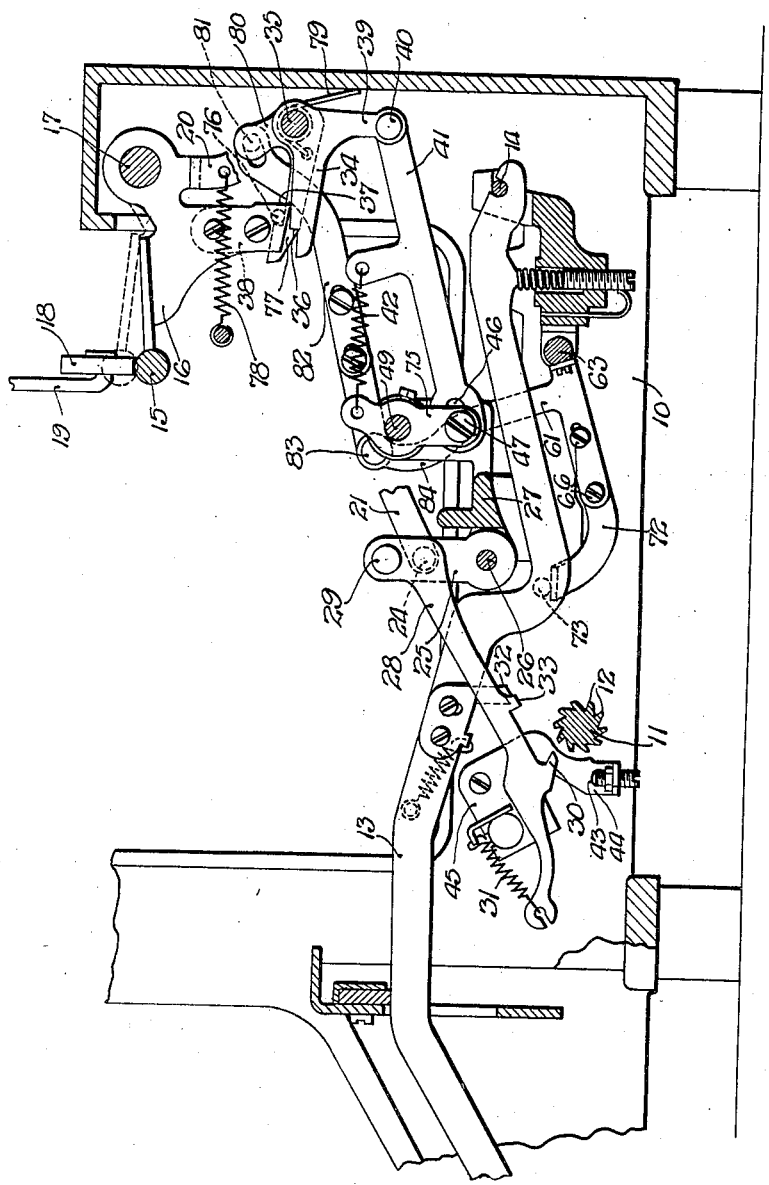

Patented Aug. 18, 1931                                                                1,819,369

UNITED STATES PATENT OFFICE

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS

CASE SHIFT MECHANISM

Application filed February 24, 1925. Serial No. 11,066.

This invention relates to mechanism for effecting case shift in typewriters, and especially to such mechanism in which a rebound lock is provided for the shifted part.

The object of the invention is to provide a case shift mechanism which shall be of improved construction and operation, and especially such mechanism as will be adaptable to a power driven typewriting machine, and in which means is provided to prevent rebound after a shifting operation.

The invention is exemplified in the combination and arrangement of parts shown in the accompanying drawings and described in the following specification, and it is more particularly pointed out in the appended claims.

In the drawings:—

Fig. 1 is a fragmentary sectional view of a portion of a typewriter taken near the right hand side of the frame and showing the case shift mechanism comprised in the present invention;

Fig. 2 is a fragmentary sectional view taken just inside the right hand side of the frame and at the right of section 1 showing the release for the shift lock; and Fig. 3 is a view looking in the same direction as in Figs. 1 and 2 but near the left side of said frame and showing the rebound lock mechanism.

In the drawings, the numeral 10 designates the frame of a typewriter having a power driven roller 11 journaled therein and extending transversely of the frame and provided with longitudinally extending teeth 12. Shift levers 13, one at each side of the machine, are pivoted at 14 for controlling the case shift movement of the typewriter. A shift rail 15 is carried by brackets 16 pivotally mounted on a shaft 17 which extends transversely of the machine at the upper rear portion thereof. A roller 18 travels on the shift rail 15 and is provided with an arm 19 which connects with the platen carriage, not shown. Each of the brackets 16 is provided with a downwardly extending arm 20 having a link 21 pivoted at the lower end thereof as shown at 22. The links 21 are provided with adjustable connections 23 and the forward ends of the links are pivoted at 24 to arms 25 pivotally mounted at 26 on a bar 27 which extends transversely of the typewriter frame. Actuators 28 are pivotally connected at 29 to the arms 25 and extend forwardly and downwardly, the forward ends being provided with teeth 30 movable into engagement with the teeth 12 on the roller 11. A spring 31 normally holds the actuator away from the power roller 11.

The shift levers 13 are provided with contact fingers 32 arranged to engage lugs 33 on the actuators 28 so that upon depression of a shift lever the tooth 30 of the corresponding actuator is brought into engagement with the power drive 11 thus drawing the actuator forwardly. This motion is transmitted through the link 21 to the bracket 16 which is rocked upon its pivot 17 to raise the shift rail.

Detents 34 are pivoted on a rod 35 and are provided with shoulders 36 arranged to engage contact shoulders 37 on stop members 38 secured to the bracket 16. The detents 34 have downwardly extending arms 39 which are pivoted at 40 to forwardly extending links 41. The links 41 are provided with springs 42 which draw the links forwardly and move the shoulder 36 behind the stop shoulder 37 to retain the shift frame in its uppermost position when it is rocked by the actuator 28 and connected parts. Adjustable contact screws 43 are provided for moving the actuators 28 out of engagement with the teeth 12 after the shifting movement is completed. These screws are carried in arms 44 projecting downwardly from brackets 45 secured to the machine frame. Since both of the levers 13 are provided with actuators 28 and the associated shifting mechanism it will be apparent that the shift rail 15 will be raised when either of the shift levers is depressed. The link 41 at the right-hand side of the machine is provided at its forward end with a slot 46 which engages a pivot pin 47 on the lower end of an arm 48 fixed to a rock shaft 49, as shown in Fig. 2. At the right-hand side of the machine the arm 48 extends upwardly above the shaft 49 and is pivotally connected at 50 to a link 51. The forward end of the link 51 is pivoted at 52 to an arm 53 somewhat similar to the arm 25 and also pivoted on the rod 26. An actuator 54 is pivoted at 55 on the arm 53 and is positioned at the opposite side of the shift lever 13 from the actuator 28. There is no direct connection between the actuator 54 and the shift lever 13 so that depression of the shift lever does not directly affect the actuator 54 in the way that it does the actuator 28.

The actuator 54 is provided with a tail piece 56 having a lug 57 thereon which rests against a projection 58 formed on a lever 59 pivotally mounted on the shaft 49 and free to rotate thereon. The lever 59 is provided with a pin 60 over which the upper end of an arm 61 is hooked. The arm 61 extend upwardly from a horizontally disposed arm 62 which is secured to a rock shaft 63. The forward end of the arm 62 is provided with a contact portion 64 arranged to engage a pin 65 on the shift lever 13. Adjustment screws 66 connect the parts of the arm 62 to permit adjustment of the contact member 64. The lever 59 is provided with a tail piece 67 and a spring 68 connects the arm 61 and the tail piece 67 tending to draw these parts toward each other. When the shift lever 13 is depressed the arm 62 will be moved downwardly so that the hooked end of the arm 61 rotates the lever 59 to move the lug 58 downwardly past the lower edge of the contact lug 57. As previously explained, the depression of the shift lever 13 causes an operation of the shift mechanism and permits the detent 34 to rotate on its shaft 35. This will move the link 41 forwardly and permit rotation of the arm 48 in a clockwise direction, as viewed in Fig. 2. This movement will operate through the link 51 to bring the contact lug 57 over the top edge of the contact lug 58. The parts will remain in this position so long as the shift lever is held depressed. As soon however as the shift lever is released the pin 60 will be permitted to move upwardly so that the spring 68 will rotate the lever 59 in a clockwise direction, as viewed in Fig. 2. This will raise the tail piece 57 and throw the tooth 70 on the actuator 54 into engagement with the teeth 12 on the power drum 11. The actuator 54 will then be moved forwardly until it is disengagd from the power drive by its adjustable screw 71. The forward movement of the actuator 54 will draw the link 51 forwardly and consequently rotate the arm 48 in a counter-clockwise direction moving the link 41 rearwardly and disengaging the detent 34 from the stop 38. This will permit the shift frame to drop to its initial position. It is thus seen that upon depression of the shift lever 13 power actuated mechanism is brought into operation to raise the platen. The platen is automatically locked in its uppermost position and retained in this position so long as the shift lever is held depressed. Upon release of the shift lever, power mechanism is automatically brought into play to trip the detent and permit the shift frame to be lowered.

The shaft 63 is provided with an arm 72 similar to the arm 62 which engages a pin 73 on the shift lever 13 at the left-hand side of the frame. By this means the power driven release mechanism at the right-hand side of the typewriter is actuated by the shift key at the left-hand side of the typewriter the same as by the shift key at the right of the machine. The shaft 49 extends across the machine to the left-hand side and is provided with an arm 75 fixed thereto in position to engage the link 41 at that side of the machine. In this way the operation of the shaft 49 by the actuator 54 releases both detents 34. At the left-hand side of the machine, as shown in Fig. 3, the stop 38 is provided with a pin 76 which is engaged by a rebound lock 77. The shift brackets 16 are provided with counterbalance springs 78 to assist in overcoming the weight of the platen and platen carriage. Where the detent 34 is quickly released there is a tendency for the platen to rebound when it reaches its lowermost position. The rebound lock 77 is pivoted on the rod 35 and is provided with a spring 79 which causes the lock to engage the pin 76 immediately upon return of the carriage to its initial position thus preventing rebound of the carriage. The lock 77 is provided with an upwardly extending arm 80 having a pin and slot connection at 81 with a link 82. The forward end of the link 82 is pivoted at 83 to an upwardly extending arm 84 carried by the arm 72 at the left-hand side of the machine. When either of the shift levers 13 is depressed the first effect will be to rock the shaft 63 and consequently the arm 84 so as to move the link 82 forwardly, thus disengaging the rebound lock 77. By the time the actuator 28 engages the power drive 12 the rebound lock will be disengaged to permit operation of the case shift mechanism. The rebound lock will remain in this position so long as either shift key is held depressed, but upon release of the shift key the spring 79 will press the rebound lock upwardly so that it will be in readiness to engage the pin 76 immediately upon return of the platen carriage to its normal position.

I claim:

1. A typewriter comprising a case shift member, power-driven mechanism for operating said case shift member, an arm rigidly connected to said case shift member to move in unison therewith, a latch associated with said arm to hold the same in upper case position, power-driven mechanism for releasing said latch to effect restoration of said case shift member to lower case position, an additional latch, and means on said arm to co-act with said additional latch to lock the said case shift member against rebound when thus restored to lower case position, and a common source of power device for both of said power driven mechanisms.

2. A typewriter comprising a case shift member, power driven mechanism for shifting said member, a shift key for controlling said power driven mechanism, a rebound lock, means for releasing said lock upon depression of said key, means for holding said shift member in its shifted position so long as said shift key is held depressed, mechanism operable from the same source of power as for said power driven mechanism for releasing said holding means upon the release of said shift key, and means for restoring said rebound lock immediately after said key is released so as to be in readiness to lock against rebound.

3. A typewriter comprising a case shift member, a power shaft, means operable from said power shaft for moving said case shift member to upper case position, a shift lever for controlling the operation of said moving means, means comprising a detent for retaining said case shift member in upper case position, means operable from said shaft for releasing said retaining means, a rebound lock, connections operated by the depression of said shift lever for releasing said rebound lock before effecting shifting of said case shift member to upper case position, and means operated by the release of said shift lever to effect the operation of said releasing means while restoring said rebound lock to operative position.

4. In a typewriter, the combination with a case shift member, of a detent for retaining said member in upper case position, power-operated means for operating said case shift member, means comprising a shift key for controlling said power-operated means, means controlled by the release of said shift key for effecting the release of said detent from the same source of power as that used for operating said case shift member, and a rebound lock automatically operative to lock said case shift member when the latter returns to lower case position.

5. The combination with a typewriter having a case shift member movable from an initial position to a shifted position, of a rebound lock for retaining said member in its initial position, a power drive for shifting said member, a shift key for connecting said power drive to said member, means operable by said shift key for releasing said rebound lock before connecting said power drive to said case shift member, means comprising a detent for maintaining said member in its shifted position, power actuated means for releasing said detent, and means controlled by the release of said shift key for connecting said last-named power actuated means to said detent.

6. The combination with a typewriter having a case shift member, of a power drive for said typewriter, an actuator for said case shift member, a shift lever for effecting connection between said actuator and power drive, a detent for retaining said member in shifted position, means movable into operative relation with said power drive for releasing said detent, means controlled by said shift lever for preventing engagement between said releasing means and power drive, and a rebound lock for retaining said case shift member in the position to which it moves after release of said detent.

7. In a typewriter, a case shift member, a shift lever, power actuated means controlled by said shift lever for shifting said case shift member, a detent for retaining said member in its shifted position, power actuated means controlled by said shift lever for releasing said detent, a rebound lock for automatically retaining said case shift member in the position to which it returns after the release of said detent said rebound lock being automatically spring-pressed into locking position upon arrival of said case shift member to its return position.

8. In a typewriter, the combination with a case shift member, of a counterbalance spring for said member, a spring actuated detent for retaining said member in its shifted position, a spring actuated means controlled by the position of said member and released thereby to move into position for preventing rebound of said member when said member is returned to its normal position, means for disconnecting said rebound preventing means from said case shift member, a power drive for shifting said case shift member, and a power actuated device for releasing said detent.

9. In a typewriter, the combination with a case shift member, of a counterbalance for said member, a shift lever, power actuated means controlled by said lever for moving said case shift member, a detent for retaining said case shift member in its shifted position, power actuated means for releasing said detent upon the release of said shift lever, a spring actuated rebound lock for retaining said shift member in its initial position after the release of said detent, said shift member being movable to initial position irrespective of the position of said rebound lock and means for releasing said rebound lock upon operation of said shift lever.

10. In a typewriter, a case shift device, a pair of shift levers, power-actuated means operable upon depression of either of said shift levers to operate said case shift device, a detent for retaining said device in its shifted position, and power actuated means for releasing said detent, said means being held inoperative when either of said shift levers is depressed.

11. In a typewriter, the combination with a case shift device, of a pair of shift levers, power actuated means for shifting said device upon depression of either of said shift levers, a detent for retaining said device in its shifted position, power actuated means for releasing said detent, a power drive for said power actuated means, and means for retaining said power actuated means out of engagement with said power drive when either of said shift levers is depressed.

12. In a typewriter, a case shift device, a shift lever for controlling said device, a detent for retaining said device in its shifted position, an actuator for releasing said detent, a power drive for said actuator, and means for mechanically connecting said actuator with said power drive upon the release of said shift lever.

13. In a typewriter, the combination with a case shift device, of a pair of separately movable detents for retaining said device in its shifted position, and a power operated actuator for releasing both of said detents.

14. In a typewriter, the combination with a case shift device, of a detent for holding said device in its shifted position, a case shift lever, means operable upon the depression of said case shift lever for shifting said case shift device, a rebound lock movable independently of said detent, means for releasing said rebound lock prior to the operation of said case shift device when said shift lever is depressed, and power-actuated means operable upon the return of said shift lever for releasing said detent.

15. In a typewriter, the combination with a case shift device, of mechanism for shifting said device, a shift lever for controlling said mechanism, a detent for retaining said device in its shifted position, a rebound lock for said device movable independently of said detent, and means for controlling said rebound lock and said detent to alternately release said lock and detent.

16. In a typewriter, the combination with a case shift device, of mechanism for shifting said device, a detent for retaining said device in its shifted position, a rebound lock movable independently of said detent for retaining said device in its initial position, a pair of shift levers, and devices cooperating one with each of said shift levers for controlling respectively said rebound lock and detent.

17. In a typewriter, the combination with a case shift device, of power actuated mechanism for shifting said device, a pair of shift levers for controlling said power actuated mechanism, a rebound lock for retaining said case shift device in its initial position, a detent for retaining said case shift device in its shifted position, levers cooperating one with each of said case shift levers, a rock shaft for constraining said levers to operate in unison with one another, power actuated mechanism controlled by one of said levers for releasing said detent when both of said case shift levers are released, and means controlled by the other of said levers for releasing said rebound lock when either of said case shift levers is depressed.

18. In a typewriter, the combination with a case shift device, of a power operated actuator for operating said case shift device to its shifted position, automatic latch mechanism for retaining said case shift device in its shifted position, a separate power operated actuator for releasing said latch mechanism to permit said case shift device to be restored to initial position, another latch mechanism for preventing rebound of the case shift device when restored to its initial position and for retaining said case shift device in its initial position, a shift key, means operable by the depresson of said shift key to release said rebound latch mechanism before said first-named power operated actuator operates said case shift device to shifted position, and means operable by the release of said shift key for connecting the second-named power operated actuator to the first-named latch mechanism to effect automatic restoration of said case shift device to its initial position.

19. In a typewriter, the combination with a power roller, of case shift mechanism, a shift key, means operated by said shift key for connecting said case shift mechanism to said power roller for operation thereby, means for automatically holding the case shift mechanism in upper case position, power-operated mechanism for releasing said holding means, and means for connecting said power-operated mechanism to said power roller upon release of said case shift mechanism.

20. In a typewriter, the combination with a case shift member, of a constantly driven toothed power shaft, mechanism operable by said power shaft for moving said case shift member to upper case position, a shift lever for connecting said moving mechanism to said power shaft, means comprising a detent for retaining said case shift member in upper case position, means for releasing said detent, and mechanism for connecting said detent releasing means to said power shaft when said shift lever is released.

21. In a typewriter, the combination with a case shift member, of means comprising a latch and a detent for holding said member in shifted position, a shift key, an actuator, means operated by said shift key for connecting said actuator to a source of power, connections between said actuator and said case shift member to effect the shifting of the latter when said actuator is operated and the operation of said latch and detent to hold the said member in shifted position, an additional actuator, connections between said additional actuator and said detent, means for holding said additional actuator disconnected from the source of power while the shift lever is depressed, and means for effecting connection of said additional actuator to the source of power when said shift lever is released to cause said additional actuator to operate the connections between the same and said detent to release the latter and permit movement of the said case shift member to lower case position.

In testimony whereof I have signed my name to this specification on this 20th day of February, A. D. 1925.

OTTO A. HOKANSON.